United States Patent Office 3,389,268
Patented June 18, 1968

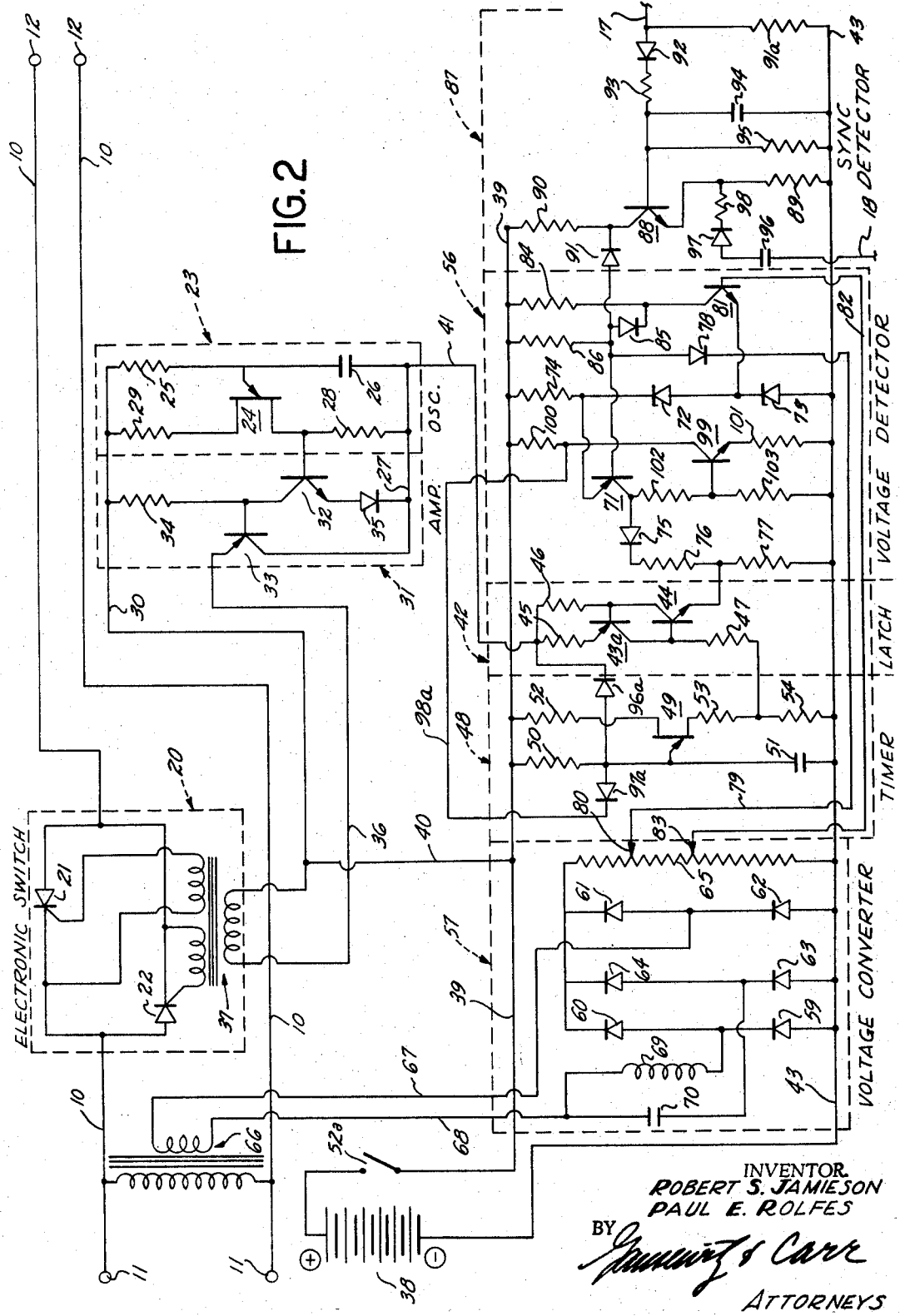

3,389,268
LINE CONTROL FOR A.C. POWER LINES
Robert S. Jamieson, San Juan Capistrano, and Paul E. Rolfes, Costa Mesa, Calif., assignors, by mesne assignments, to Lorain Products Corporation, Lorain, Ohio, a corporation of Ohio
Filed Mar. 16, 1964, Ser. No. 352,103
9 Claims. (Cl. 307—66)

ABSTRACT OF THE DISCLOSURE

A line control in which a synchronism signal is derived from an A.C. power line on the input side of a line switch, such signal being fed through a variable phase-shift means. The phase-shifted signal is used to govern a synchronism control which, in turn, drives an inverter the output of which is continuously connected to the line on the output side of the line switch. Means, including a synchronism detector which compares signals from the synchronism control and from the inverter, are provided to open the line switch in response to out-of-tolerance voltage or frequency conditions.

---

Figure 1:
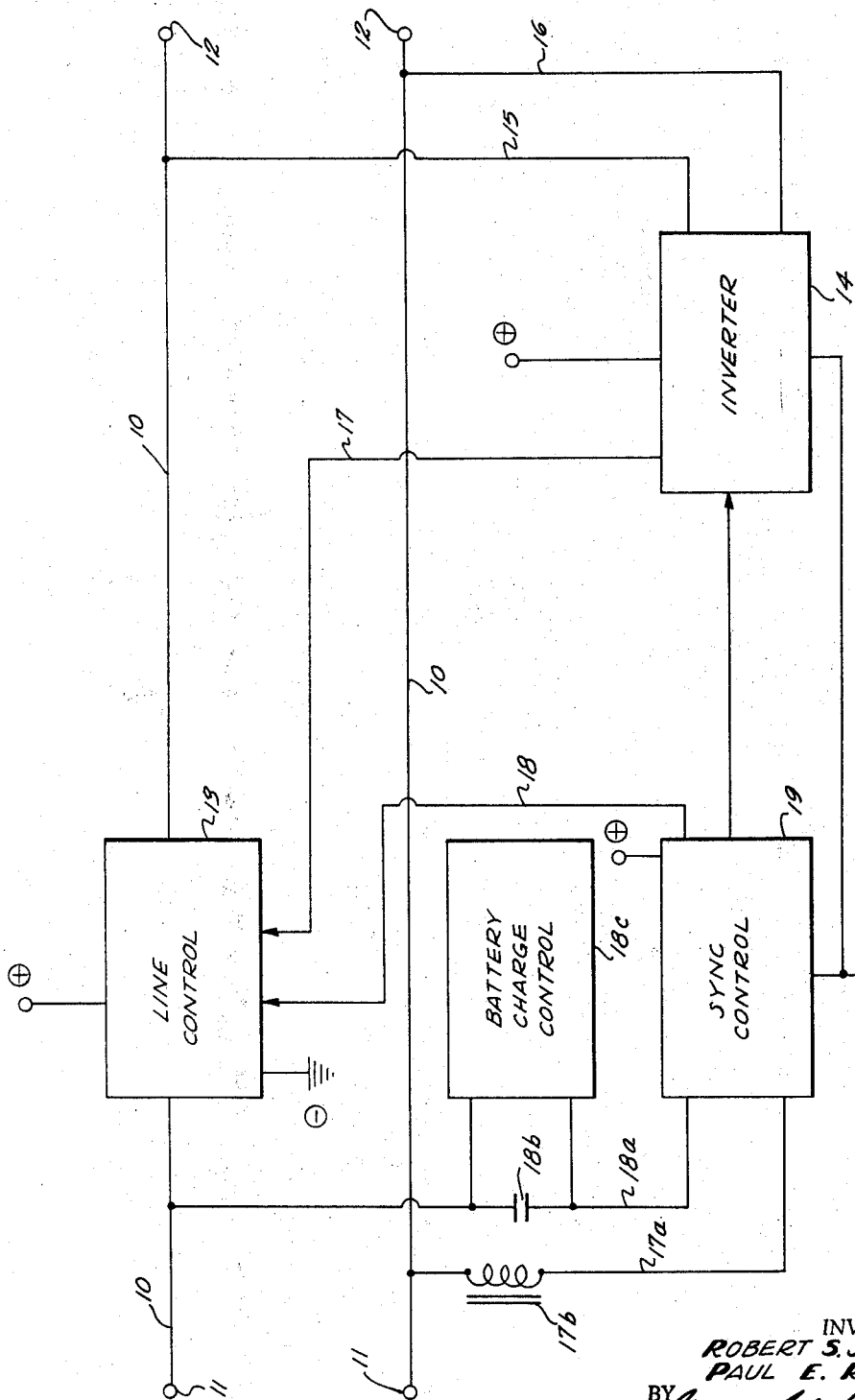

This invention relates to an apparatus for opening an A.C. power line in response to various conditions, for example when the line voltage is excessively high or low or when a standby power-supply system associated with the line is not properly synchronized therewith.

The present apparatus is particularly adapted to be employed in the standby power-supply system described in co-pending patent application Ser. No. 337,621, filed Jan. 14, 1964, for Continuously-Operating Standby Power-Supply and Battery-Charging Apparatus and Method, inventor Robert S. Jamieson. The present invention is not, however, limited to such circuit, there being other circuits wherein it is desirable to open a power line in response to undesirable conditions of the general type indicated.

The standby power-supply system described in the cited application is continuously operating, being connected to the A.C. power line at all times in order that there will be a completely uninterrupted supply of power to a load connected to the line. Such system does not attempt to regulate the line voltage, operating instead to disconnect the line (by opening the line control) during periods when the magnitude of the line voltage is excessively high or low, all power to the load then being supplied by the standby system and not by the line voltage source. When the magnitude of the line voltage is again within the desired operating range, the line control closes (after a time-delay period sufficient to insure that the standby system is generating a voltage wave which is substantially in phase with the line voltage wave) and thus reconnects the line voltage source to the load. The standby system then floats or idles, in parallel with the line, until the line voltage again varies excessively.

There are many loads, for example certain computers, which require that the line voltage be maintained above a predetermined minimum at substantially all times. The line controls in systems which are associated with loads of the type indicated must be adapted to operate extremely rapidly. It is therefore one of the important objects of the present invention to provide a line control which senses undesirably low line voltages in a very short time period, yet is relatively simple and economical to manufacture and use.

Another object of the present invention is to provide an apparatus for opening an A.C. power line in response to an overvoltage therein, thereby protecting the load which is associated with such line.

The invention described in the cited patent application requires that the standby power-supply system generate a voltage wave which is synchronized in frequency with the line voltage wave, in order to prevent the occurrence of large transient circulating currents. There are, however, conditions which tend to cause the standby system to go out of synchronism with the line. It is thus another important object of the present invention to provide a line control which opens the line during periods when the standby system is out of synchronism therewith, which line control does not interfere with the battery-charging portion of the system.

Another object of the present invention is to provide time-delay circuitry for delaying closing of the line control for a predetermined period after resumption of desired line voltage conditions, and desired frequency-synchronism conditions, and for insuring that the line is not closed unless such desired voltage and frequency conditions are present continuously throughout the entire time-delay interval.

These and other objects will become apparent from the following detailed description taken in connection with the accompanying drawings in which:

FIGURE 1 is a schematic diagram illustrating the relationship between the A.C. power line, the line control, and a standby power-supply system of the type described in the cited application; and FIGURE 2 is a wiring diagram illustrating one embodiment of the line control 13.

Referring first to FIGURE 1, a conventional 60-cycle A.C. power line is indicated at 10, having input terminals 11 and output terminals 12. The line control 13 is interposed in the line 10 in order to open the same in response to undesired voltage or synchronism conditions. The line control 13 was referred to in the cited patent application, relative to the reference numeral 19 therein.

The standby power-supply system includes a suitable inverter 14 having output leads 15 and 16 which are connected to the line 10 on the output side of line control 13. Thus, the inverter is adapted to supply standby power to the line 10, and to a load which is connected to output terminals 12, during periods when line control 13 is in open-circuit condition. The inverter 14 includes the parallel square-wave SCR-reactance diode inverter described in the cited application relative to reference numeral 13 therein, the associated ferroresonant transformer described relative to reference numeral 15 therein, the battery described therein relative to reference numeral 14, and the means for driving the gates of the inverter. Such gate-driver means may include an oscillator and flip-flop (numbered 45 in the cited application) which supplies a square-wave signal to the gates of SCR's incorporated in the inverter. As will be set forth subsequently herein, such square-wave signal is also transmitted through a lead 17 to the line control 13. The signal transmitted from inverter 14 through lead 17 to line control 13 constitutes one of the inputs permitting the line control to determine when the desired synchronism is not being maintained.

The remaining input to line control 13, permitting the same to open in response to out-of-synchronism conditions, is through a lead 18 from a sync control 19. The input of such sync control 19 is derived from line 10, on the input side of line control 13, by means of leads 17a and 18a. Such sync control may include the sync generator and sync gate described in detail in the cited application relative to reference numerals 42 and 43. Because such sync generator produces a square-wave voltage, the signal transmitted through lead 18 from sync control 19 to line control 13 is (similarly to the signal transmitted through lead 17) a square-wave signal.

As a specific illustration, lead 17 may be connected to the output of a flip-flop which drives the gates of inverter 14. Lead 17, on the other hand, may be connected to the same point in sync generator 42 (of the cited patent application) as is the lead 117 described therein, namely to the cathode of one of the two back-to-back Zener diodes 51 and 52 described therein.

An inductor 17b is interposed in lead 17a, whereas a capacitor 18b is interposed in lead 18a. A battery-charge control 18c is connected across capacitor 18b to variably bypass the same (and thus shift the phase of the sync signal) in accordance with the voltage of the battery portion of inverter 14. These elements also were described in detail in the cited application, being numbered 48, 49 and 101 therein.

Remaining portions of the standby power-supply and battery-charging apparatus will not be described herein, being completely described and illustrated in the cited application and in other patent applications subsequently filed under the name of either of the present inventors. Thus, for example, the positive and negative supply leads, which are schematically represented in FIGURE 1 by the "plus" and "minus" signs and by the ground symbol, will not be described specifically herein.

There will next be described, primarily in relation to FIGURE 2 which shows the details of the entire line control 13, the exact construction and operation of one specific embodiment of such line control.

*Detailed description of the line switch and of the associated circuitry for maintaining the same in conduction except during continuance of an out-of-tolerance condition*

The line switch (forming one element of line control 13) is an electronic switch, indicated at 20 in FIGURE 2, comprising two SCR's 21 and 22 which are arranged in parallel relative to each other and in reverse-oriented relationship. Thus, during one half-cycle of the current wave in line 10, one of the SCR's is in conduction, whereas the other SCR conducts during the remaining half-cycle of the current wave. It should be noted that, because of the reactive nature of the loads frequently connected to the line output terminals 12, such current wave is often not in phase with the voltage wave in the line. The electronic switch 20 is maintained closed (in conduction) at all times, except during continuance of an out-of-tolerance condition making it necessary to deliver standby power from the inverter 14 to output terminals 12, by applying gate signals simultaneously and continuously to the gates of both SCR's 21 and 22.

In the illustrated circuit, the gate-drive voltage for electronic switch 20 is derived from a unijunction transistor relaxation oscillator 23 which oscillates at a relatively high frequency, such as 15 kilocycles. Because such frequency of oscillation is relatively high, the time interval which elapses between the instant when either SCR is forward biased and the instant when it is actually triggered becomes negligibly small. Oscillator 23 is of conventional construction, being described on page 194 of the General Electric Transistor Manual, sixth edition. Thus, the oscillator comprises a unijunction transistor 24 the emitter of which is connected between a charge resistor 25 and a charge capacitor 26. Base-one of unijunction 24 is connected through a resistor 28 to a lead 27, whereas base-two of the unijunction is connected through a second resistor 29 to lead 30. The remaining terminals of resistor 25 and capacitor 26 are also connected, respectively, to leads 30 and 27.

The output of oscillator 23 is amplified by a suitable amplifier 31 including a first transistor 32 and a second transistor 33, the latter being connected in emitter-follower relationship. A suitable resistor 34 and diode 35 are connected in the amplifier for current-limiting and bias purposes, as is well known in the art.

The emitter of transistor 33 is connected through a lead 36 to the primary of a pulse transformer 37, the remaining terminal of such primary being connected to the lead 30 previously indicated. Transformer 37 has two secondaries, the first of which is connected between the gate and cathode of SCR 22, and the second of which is connected between the gate and cathode of SCR 21. The amplification created by amplifier 31, and the winding relationship in transformer 37, are such that the voltage supplied to the SCR gates is adequate, in response to each (any) pulse generated by the unijunction oscillator 23, to effect triggering of whichever one of SCR's 21 and 22 is forward biased.

The above-indicated lead 30 is, in addition to forming part of the circuitry associated with the primary of transformer 37, the B+ or positive supply lead for oscillator 23. The positive voltage supplied to lead 30 is derived from a battery 38 by means of a positive lead 39 and an additional lead 40. The negative return from oscillator 23 and the associated circuitry is through a lead 41 and a latch circuit 42 to the negative lead 43 associated with battery 38.

From the above it will be understood that the oscillator 23 and other gate-drive means for SCR's 21 and 22 are only operative during periods when the latch 42 is in closed-circuit condition. Stated otherwise, the gate drive for SCR's 21 and 22 may be interrupted, and line 10 accordingly opened, by opening the latch 42 and thereby interrupting the flow of current from lead 41 to negative lead 43. As will be described in detail subsequently, the latch is shifted to open condition in response to the above-indicated conditions, namely, overvoltage, undervoltage, or asynchronism.

*Description of latch 42 and the associated delay timer*

Latch 42 consists of first and second transistors 43a and 44 of complementary symmetry, such transistors being connected bases to collectors. This is a conventional hook connection, as described on page 45 of the General Electric Transistor Manual, second edition. Transistor 43a is illustrated as being a PNP, whereas transistor 44 is an NPN. The indicated regenerative circuit has two stable states—both transistors simultaneously on or both transistors simultaneously off. The emitter and base of transistor 43a are connected, respectively, through resistors 45 and 46 to the negative return lead 41 indicated above. The base of transistor 44 is connected through a resistor 47 to the output of a delay timer 48 next to be described.

The timer 48 is illustrated as comprising a unijunction transistor relaxation oscillator which is similar to the above-described oscillator 23 except that it has an extremely long period (low frequency). Thus, the timer 48 includes a unijunction transistor 49 the emitter of which is connected through a resistor 50 to positive lead 39, being also connected through a capacitor 51 to negative lead 43. The resistor 50 and capacitor 51 are so large that the capacitor charges very slowly, requiring a time period on the order of 30 seconds (for example) before the firing voltage of transistor 49 is achieved.

Base-two of the unijunction 49 is connected through a resistor 52 to positive lead 39, whereas base-one of the unijunction is connected through series-related resistors 53 and 54 to negative lead 43. Resistors 53 and 54 constitute a voltage divider determining the magnitude of the voltage pulse which is transmitted through resistor 47 to the base of latch transistor 44.

A portion of the operation of the timer 48 and associated circuitry will next be described, disregarding for the present the effect of several inhibiting inputs to such timer. When D.C. voltage is applied to the timer, for example by closing of a switch 52a in positive lead 39, capacitor 51 commences to be charged slowly through the resistor 50. When, at the end of the predetermined time-delay period, the charge of capacitor 51 thus builds up to the firing voltage of unijunction 49, the unijunction conducts and permits the capacitor 51 to discharge through resistor 47 to the base of NPN transistor 44, causing such transistor to conduct. For reasons well known in the art, the second transistor 43a is thus caused to conduct also, causing the latch to be in its latched or "on" bistable condition.

The D.C. circuit to high-frequency oscillator 23 is thus completed since current may flow from lead 27 through lead 41 and latch 42 to negative lead 43, for example through resistors 45, 47 and 54. Oscillator 23 is therefore caused to be in oscillation, and gate-drive signal is supplied to SCR's 21 and 22 as above described.

Latch 42 will continue in its "on" (latched) bistable state until one of the transistors 43a and 44 is cut off for any reason. For example, the latch could be caused to revert to its "off" (unlatched) bistable state by opening a switch (not shown) in lead 41 and thus interrupting the supply of positive voltage to the latch. In the illustrated circuit, the latch is caused to revert to its "off" bistable condition by supplying thereto an external bias which is in a direction to cut off one of the transistors. As will be described in detail hereinafter, such external bias is applied by means of a voltage detector 56 including an "unlatch" portion and which, together with its associated voltage converter and sync detector, form an important part of the present invention.

*Description of circuitry particularly adapted to open switch 20 in response to undervoltage condition in line 10*

The detection of an undervoltage condition in line 10, and the supplying of an unlatch pulse to latch 42 in response to the presence of such undervoltage condition, requires the conjoint operation of the indicated voltage detector 56 and a voltage converter 57. Of these, the voltage converter 57 will first be described.

The voltage converter 57 comprises two full-wave rectifier bridges each adapted to rectify a portion of a split-phase signal which is derived from line 10 on the input side of electronic switch 20. One of such rectifier bridges comprises two series-related diodes 59 and 60 which are connected to a second pair of series-related diodes 61 and 62. The second of such bridges comprises an additional pair of series-related diodes 63 and 64 and also comprises the previously indicated diodes 61 and 62. Thus, the diodes 61 and 62 are common to both of the rectifier bridges. In addition, a load resistor 65, preferably comprising the winding of a potentiometer, is the load for both of such rectifiers. Accordingly, it will be understood that the rectified signals are superimposed in the potentiometer winding 65.

The signal to be rectified is derived from line 10 by means of a transformer 66 one output terminal of which is connected through a lead 67 to a circuit junction between diodes 61 and 62. The other side of the transformer output is connected through a lead 68 to a phase-splitting network comprising an inductor 69 and capacitor 70. The inductor is connected to a circuit junction between diodes 59 and 60, whereas the capacitor is connected to a circuit junction between diodes 63 and 64.

The signal present in lead 68 is phase-advanced by capacitor 70, for example approximately 45 degrees. Such signal is also phase-retarded by the inductor 69, again approximately 45 degrees in a typical case. It follows that the output of the bridge 59, 60, 61 and 62 is a full-wave rectified signal lagging by approximately 45 degrees, whereas the output of the bridge 63, 64, 61 and 62 is a full-wave rectified signal leading by approximately 45 degrees. The above-indicated superimposition of such signals in resistor 65 produces a D.C. voltage the ripple frequency of which is double that of either of the bridges, namely, four times the frequency of the line voltage wave.

A very important result achieved by voltage converter is that the output present in resistor (potentiometer winding) 65 does not ever go to zero except during periods of complete power failure. Furthermore, and very importantly, the maintaining of the output voltage above zero at all times is achieved without resorting to a storage element such as a filter capacitor of the type conventionally employed in power supplies. Such a filter capacitor would be highly unsatisfactory in the present system because, upon failure of the line voltage wave delivered to input terminals 11, several cycles would be required for the voltage stored in the filter to decay to zero. The time required for such decay would produce an excessive time delay prior to actuation of the latch 42 and consequent termination of the gate signals delivered from oscillator 23 to electronic switch 20.

Let it be assumed, for example, that a normal voltage in line 10 would produce a voltage converter output of approximately 15 volts average, and that the ripple voltage (along the tops of the superimposed waves in resistor 65) is two volts (peaks approximately one volt higher, and valleys approximately one volt lower, than the average ripple voltage). Let it also be assumed that the voltage detector 56 (to be described subsequently) is set to actuate at a level of approximately 13 volts. If the line voltage then gradually decreased, a time would arrive when the dips or valleys in the ripple voltage would decline from approximately 14 volts to approximately 13 volts, at which time the detector 56 would generate an unlatching signal and would cause the latch 42 to effect cessation of gate signals to switch 20.

If the decay in line voltage is not gradual, but instead results from a sudden short circuit, for example, the output of the voltage converter 57 would go to zero almost instantly and would again cause the detector 56 to generate an unlatching signal. This would not occur completely instantaneously, of course, since there is always a certain amount of storage of energy in the phase-splitting network 69–70. Such storage is only a very small fraction, however, of the energy storage which would be effected by a filter capacitor, for example.

It is to be understood that under certain conditions of operation the termination of gate signals to SCR's 21 and 22 will not open the line until the end of the particular half-cycle of the line current wave, this being because SCR's will conduct (after triggering) so long as they are forward biased. Under other and highly important conditions of operation the line switch 20 will open substantially immediately, before the end of the half-cycle. For example, a short in the line, at the input side of switch 20, will cause the inverter voltage to be much higher than the line voltage. Current will then tend to flow in a direction which is the reverse of the normal direction of current flow when line power is present. Such reverse condition cuts off the then-conducting SCR, before the end of the half-cycle. The remaining SCR will not commence to conduct because it has no gate drive.

Referring next to the voltage detector 56, which includes (as indicated above) an unlatch circuit adapted to send a pulse to latch 42, this comprises a PNP transistor 71 the emitter of which is connected through two series-related Zener diodes 72 and 73 to negative lead 43. The junction between the Zener 72 and the emitter of transistor 71 is connected through a resistor 74 to positive lead 39. The collector of transistor 71 is connected to several load circuits, one of which comprises a diode 75 and two series-related resistors 76 and 77, the latter of which is connected to negative lead 43. Such resistors comprise a voltage divider, the junction therebetween being connected to the emitter of latch transistor 44.

When transistor 71 (which may be termed the "unlatch" transistors) is in conduction, a circuit is completed from positive lead 39 through resistor 74, transistor 71, diode 75, and resistors 76 and 77 to lead 43. The resulting increased current flow through resistor 77 causes the emitter of transistor 44 to become positive with respect to the base thereof, so that such transistor is cut off and effects cessation of operation of oscillator 23 as described heretofore.

The unlatch transistor 71 is caused to conduct, upon occurrence of an undervoltage condition, by connecting the base thereof through a diode 78 and lead 79 to a slider 80 on potentiometer winding 65 in voltage converter 57.

The breakdown voltages of Zeners 72 and 73 total a predetermined magnitude, for example nine volts (five for Zener 72 and four for Zener 73). The emitter of unlatch transistor 71 is thus nine volts positive with reference to ground (the voltage in negative lead 43). Therefore, if the D.C. ripple voltage at slider 80 remains more than nine volts positive with reference to ground, diode 78 remains decoupled, and unlatch transistor 71 is cut off since it has no forward bias. If at any instant the voltage at slider 80 drops below nine volts (in the given example), the base of unlatch transistor 71 becomes negative with respect to the emitter thereof, causing such transistor to conduct. This results in an unlatching pulse to latch 42, as previously described, causing oscillator 23 to cease operating. It is pointed out that the voltage thus being sensed is that of each valley or dip in the voltage ripple.

The position of slider 80 is adjusted in accordance with the desired minimum line voltage to be tolerated by the system. Stated more definitely, the position of slider 80 is set so that a nine-volt voltage drop will exist from slider 80 to negative lead 43 at the instant when the ripple voltage in resistor 65 is at the bottom or valley of the ripple, and when the line voltage is at the lower tolerable limit. Accordingly, when the line voltage declines sufficiently to make one of the low points or valleys in the ripple voltage represent less than nine volts with respect to ground, at slider 80, unlatching will occur.

*Description of those portions of circuits 56 and 57 relating particularly to overvoltage sensing*

The overvoltage-detection portion of the circuit 56 includes an NPN transistor 81 the emitter of which is connected to the junction between Zeners 72 and 73, so that such emitter is referred to a constant voltage with respect to ground. The base of transistor 81 is connected through a lead 82 to a second slider 83 on potentiometer winding 65, such second slider being between the first-mentioned slider 80 and negative lead 43.

The collector of transistor 81 is connected through a resistor 84 to positive lead 39, being also connected through a diode 85 to the base of unlatch transistor 71.

Assuming again, for purposes of illustration, that Zener 73 has a breakdown voltage of four volts, the slider 83 is so adjusted that the voltage which it picks off from winding 65 will be less than four volts except during periods when the magnitude of the line voltage wave (at the peaks) is greater than a desired maximum (tolerance) value. So long as such voltage at slider 83 is less than four volts, the base of transistor 81 will be negative with respect to the emitter thereof, so that transistor 81 will remain in cut-off condition. Should any of the peaks of the D.C. ripple voltage in resistor 65 exceed four volts with respect to lead 43, the base of transistor 81 will be momentarily positive with respect to the emitter, causing such transistor to conduct.

Conduction in transistor 81 will cause diode 85 to become forward biased, so that the base of unlatch transistor 71 becomes negative with respect to the emitter thereof. Conduction in transistor 71 therefore commences. Accordingly, as described above relative to the undervoltage detector (including diode 78), an unlatch signal is again transmitted to the latch 42 to effect unlatching thereof and consequent termination of the drive for the gates of switch 20.

The resistor 86, which is connected between positive lead 39 and the base of unlatch transistor 71, serves as a base cut-off path and as a finite impedance for the associated diodes. Furthermore, such resistor serves as a leakage path during temperature excursions, to prevent the unlatch transistor from turning itself on. The magnitude of such resistor may be, for example, 33 kilohms.

*Synchronism detector*

The sync (synchronism) detector has been given the reference numeral 87, and comprises an NPN transistor 88 the emitter of which is connected through a resistor 89 to negative lead 43. The collector of sync transistor 88 is connected through a resistor 90 to positive lead 39, being also connected through a diode 91 to the base of unlatch transistor 71. When transistor 88 is in conduction, diode 91 operates (as previously described relative to diode 85) to cause unlatch transistor 71 to conduct and effect unlatching of latch 42.

As stated earlier in this specification, leads 17 and 18 are connected to sync detector 87 from the inverter 14 and the sync control 19 (FIGURE 1). Thus, the sync detector operates by comparing the square wave which drives the inverter with the square wave which is utilized to synchronize the inverter. Lead 17 is connected through a resistor 91a to negative lead 43, and through a diode 92 and resistor 93 to the base of sync transistor 88. A capacitor 94 and resistor 95 are each connected (in parallel) between the base of transistor 88 and negative lead 43.

The square-wave signal transmitted through lead 17 from inverter 14 is differentiated, by the described circuitry, in such manner as to produce a rather sharp (narrow) pulse at the base of transistor 88.

The lead 18 from sync control 19 is connected through a capacitor 96, a diode 97 and a resistor 98 to the emitter of sync transistor 88. This circuit operates in such manner as to form a pulse in response to application of the square-wave signal present in lead 18, such pulse being much wider than is the pulse transmitted to the base of transistor 88. Because both pulses are derived from square-wave voltages having fixed magnitudes, such pulses have fixed peaks and fixed durations. Both pulses are positive going. The magnitudes of the pulses are such that the voltage applied to the emitter of transistor 88 will dominate or mask the voltage applied to the base thereof during periods when the pulses are substantially in phase with each other. Accordingly, the pulse applied to the emitter of transistor 88 may be referred to as a masking pulse.

During periods when the voltages applied to the base and emitter of transistor 88 are substantially in phase with each other, the voltage of the emitter is greater than that of the base so that such transistor is maintained in cut-off condition. When the voltages applied to the emitter and base are substantially out of phase relative to each other, transistor 88 will conduct during the time period when the base voltage is greater than the emitter voltage. When such transistor conducts, diode 91 is no longer back-biased and therefore causes the base of transistor 71 to become negative with respect to the emitter thereof, so that transistor 71 commences to conduct. This, as previously described, causes transmission of an unlatch signal to latch 42, and consequent termination of the drive for the gates of line switch 20.

The pulse applied to the emitter of transistor 88 is caused to be wider than the pulse applied to the base thereof in order to permit a certain degree of phase shift to occur in the circuitry without effecting unlatching. Furthermore, it is a feature of the invention that the lead 18 is connected to sync control 19 at the previously indicated point which is not affected by the phase shift caused by the reactive elements 17b and 18b referred to previously and described in detail in the cited patent application. In this manner, phase shift is permitted to occur in the standby power-supply system described in the cited patent application, as required to effect charging of the battery by charge control 18c, without adversely affecting the present sync detector 87. Stated otherwise, by sensing the phases present at the sync control 19 and inverter 14, regardless of the phase shift which occurs between line 10 and the sync control 19, the present sync detector is caused to become highly functional and satisfactory in operation.

It is to be understood that the system represented schematically by FIGURE 1 may go out of synchronism for various reasons, including lightning flashes, the presence of a highly distorted voltage wave in line 10, etc. Because of the sync detector 87 and associated circuitry, the line 10 and the load connected to output terminals 12 thereof are protected from the effects of such an asynchronous condition.

*Description of circuitry for resetting the timer 48 under various conditions*

There next will be described the several inhibiting inputs for timer 48, and the reasons therefor.

One of the inhibiting inputs for timer 48 comprises a diode 96a which is connected between latch 42 (at the junction thereof with lead 41) and the junction between resistor 50 and capacitor 51. Before latching occurs, diode 96a is back-biased and does not conduct. When the latch 42 turns on, diode 96a goes into forward conduction and effectively shorts out the capacitor 51 by means of a circuit including capacitor 51, diode 96a, the latch, resistors 45, 47 and 54 (and resistor 77), and negative lead 43 back to capacitor 51. Stated otherwise, charging current from positive lead 39 and resistor 50 is diverted around the capacitor 51 so that the same may not recharge after the unijunction 49 fires. The described circuitry prevents the timer 48 from recycling repeatedly, it being pointed out that such recycling may cause the latch to shift to "on" condition at times whene it should be in "off" condition.

It is emphasized that the diode 96a and associated circuitry prevent operation of the timer after latching has occurred, so that the oscillator 23 is operating and electronic switch 20 is in closed-circuit condition. There next will be described the second inhibiting input for the timer, such second input being adapted to effect recommencement of the time-delay interval prior to the time when latching occurs, and in response to any out-of-tolerance condition which occurs during such time-delay interval.

Such second inhibiting input comprises a diode 97a which is interposed in a lead 98a, the latter extending from the junction between elements 50–51 to the collector of an NPN transistor 99 which may be referred to as the "reset" transistor. Stated more definitely, lead 98a connects to the junction between the collector of transistor 99 and a resistor 100, the remaining terminal of the latter being connected to positive lead 39. The emitter of transistor 99 is connected through a resistor 101 to negative lead 43. The base of such transistor is connected to the junction between two series-related resistors 102 and 103 which together comprise the second of the above-mentioned load circuits for the collector of unlatch transistor 71.

Because the resistors 102 and 103 form a voltage divider the intermediate point of which is connected to the base of reset transistor 99, a positive voltage of predetermined magnitude (sufficient to cause transistor 99 to conduct) will be applied to transistor 99 each time the unlatch transistor 71 goes into conduction. When transistor 99 conducts, the diode 97a becomes forward biased and therefore diverts current (which would otherwise flow into timer capacitor 51) through lead 98a, transistor 99 and resistor 101 to negative lead 43. Furthermore, the indicated circuit permits any charge already present on timer capacitor 51 to be passed to ground. Accordingly, the reset transistor 99 causes recommencement of the time-delay interval in response to each operation of unlatch transistor 71, which in turn occurs when any of the three inputs thereof (undervoltage, overvoltage or asynchronism) causes conduction in transistor 71.

As an illustration, let it be assumed that the line voltage persists in a marginally low condition, causing the above-described forward biasing of diode 78 at every low point in the ripple voltage created by voltage converter 57. The unlatch transistor 71 will then generate a pulse train, causing the reset transistor 99 to conduct intermittently and effect the above-indicated discharge of timer capacitor 51. Accordingly, although timer 48 attempts to start during the interval between each of the indicated pulses, less than one quarter-cycle will elapse before the inhibiting input through diode 97a causes recommencement of operation of the timer. It follows that the capacitor 51 will not charge to a voltage sufficient to fire unijunction 49 until there has been an absence of all out-of-tolerance conditions for the full time-delay period, for example 30 seconds as previously indicated. It is therefore assured that all conditions are relatively steady state, and free of transients, before the switch 20 is operated to close the line.

*Summary of operation*

Let it be assumed that the electronic switch 20 is in open-circuit condition, that the desired A.C. input (not out of tolerance) is applied to line terminals 11, and that all capacitors are initially discharged.

Closing of switch 52a effects charging of timer capacitor 51 through resistor 50. This effects, after a time-delay interval of 30 seconds, for example, firing of unijunction transistor 49 to discharge the capacitor 51 through resistors 53 and 54. A positive latching signal or pulse is accordingly transmitted through resistor 47 to the base of latch transistor 44, causing such transistor and the associated latch transistor 43a to conduct.

The described latching action completes a circuit through the high-frequency unijunction oscillator 23, namely from the battery 38 through leads 39, 40, 30, oscillator 23, lead 41, latch 42, and negative lead 43 back to the battery. High-frequency oscillator 23 is thus caused to oscillate, and produces pulses which are amplified by amplifier 31 and transmitted through transformer 37 to the gates of both of the SCR's 21 and 22. It follows that the line 10 is closed.

The indicated latching action also completes a circuit from the timer capacitor 51 through diode 96a and latch 42 to the remaining terminal of capacitor 51, thereby preventing recycling of the timer.

Should the line voltage supplied to line input terminals 11 reduce to less than the desired tolerance value at any time, the voltage sensed by slider 80 at the output of the split-phase voltage converter 57 will be reduced to a value less than that which is present at the emitter of unlatch transistor 71, such emitter voltage being determined by the two Zener diodes 72 and 73. The base of unlatch transistor 71 is thus made negative with respect to the emitter thereof, causing transistor 71 to conduct and transmit to the emitter of latch transistor 44 a signal adapted to effect unlatching thereof. The above-described circuit through oscillator 23 is therefore broken, causing oscillator 23 to cease oscillating so that the gate drive for electronic switch 20 is terminated and such switch therefore opens.

Should the voltage delivered to line input terminals 11 become excessively high at any time, the voltage sensed by slider 83 at the output of voltage converter 57 will become higher than the voltage applied to the emitter of transistor 81, such emitter voltage being referred to the constant voltage present across Zener 73. Transistor 81 will then conduct and effect forward biasing of diode 85, thereby causing the base of unlatch transistor 71 to become negative with respect to the emitter and again resulting in transmission of an unlatching pulse to latch 42 to repeat the above-indicated operation and effect opening of switch 20.

Should the inverter 14 (FIGURE 1) go out of synchronism with the sync control 19, due to a lightning flash or other condition, the sync detector 87 will operate in such manner as to effect conduction in transistor 88, diode 91 then becoming forward biased and causing conduction in transistor 71 as was described relative to diode 85. The transistor 88 conducts because a relatively wide masking pulse applied through lead 18 to the emitter thereof is then not in registry with a relatively narrow pulse transmitted through lead 17 to the base of such transistor from the gate drive means for inverter 14. The sensing of such out-of-synchronism condition is effected on the output side of a phase-shifting network 17b–18b which cooperates with the battery-charge control 18c to shift the phase of the sync signal relative to the phase of the line voltage wave. In this manner, the sync detector 87 is rendered practical and commercial for use in standby power-supply systems wherein phase shifting is effected for battery-charging purposes.

After the out-of-tolerance condition ceases to exist, the timer capacitor 51 recharges and (at the end of the predetermined time-delay interval) effects firing of unijunction 49 to deliver a latch signal to latch 42 and thereby effect resumption of operation of oscillator 23 to reclose the switch 20. However, should any of the indicated out-of-tolerance conditions recur during the time-delay interval, a circuit will be completed through diode 97a, lead 98a and reset transistor 99 to discharge the capacitor 51 and effect recommencement of the time-delay period. Transistor 99 conducts at all times when the unlatch transistor 71 conducts.

It is to be understood that closing of the line switch 20 is not effected until the voltage wave delivered to input terminals 11 by the line power source is substantially in phase with the voltage wave delivered by the inverter 14 to line 10. Circuitry for achieving this result is described in the cited application and also in an application Serial No. 351,676, filed March 13, 1964, for a Phase-Control System, and Standby Power-Supply and Battery-Charging Means Incorporating the Same, inventor Paul E. Rolfes.

The functions of various current-limiting, biasing, and temperature-compensating resistors, diodes, and other elements have not been described in detail since these are conventional in the art. Instead, the description has been limited to a discussion of those features which are important to the various concepts forming part of the present invention.

The foregoing detailed description is to be clearly understood as given by way of illustration and example only, the spirit and scope of this invention being limited solely by the appended claims.

We claim:
1. A standby power-supply system for use with an A.C. power line, said system including:
   a line switch interposed in said line,
   a synchronism control,
   a battery-inverter system continuously connected to said line on the output side of said line switch,
   means including a variable phase-shift means to derive a synchronism signal from said line on the input side of said line switch and to transmit said synchronism signal to said synchronism control,
   a synchronism detector,
   means to transmit a signal from said synchronism control to said synchronism detector,
   means to transmit a signal from said inverter system to said synchronism detector, and
   means connected to said synchronism detector to open said line switch in response to asynchronism between said synchronism control and said inverter system.

2. The invention as claimed in claim 1, in which means responsive to the charge on the battery portion of said battery-inverter system are provided to vary the degree of phase shift introduced by said variable phase-shift means.

3. A standby power-supply system for use with an A.C. power line, said system including:
   a line switch interposed in said line,
   a synchronism control,
   a battery-inverter system connected to said line on the output side of said line switch,
   means including a variable phase-shift network to derive a synchronism signal from said line on the input side of said line switch and to transmit said synchronism signal to said synchronism control,
   a synchronism detector,
   means to transmit a signal from said synchronism control to said synchronism detector,
   means to transmit a signal from said inverter system to said synchronism detector,
      said synchronism detector being adapted to provide a control effect in response to asynchronism between said synchronism control and said inverter system, said synchronism detector including differentiator means to cause one of said signals from said inverter and synchronism control to mask the other except during periods when asynchronism occurs, and
   means responsive to the absence of said masking to open said line switch.

4. A standby power-supply system for an A.C. power line comprising:
   a line switch interposed in said line to open and close the same,
   a battery-inverter system connected to said line on the output side of said line switch,
      said system being adapted to supply power to said line during periods when said line switch is open,
   means to drive said system in frequency synchronism with said line, and
   means to open said line switch in response to any of the following out-of-tolerance conditons:
      an overvoltage in said line,
      an undervoltage in said line, and
      lack of frequency synchronism between said line and said system.

5. A line control for an A.C. power line through which an alternating voltage wave having a predetermined frequency and magnitude is normally passed, comprising:
   an electronic switch interposed in said line and incorporating first and second SCR's,
   a unijunction transistor relaxation oscillator,
   amplifier and transformer means to deliver voltage pulses from said oscilator to the gates of said SCR's to trigger the same,
   voltage converter means to derive a signal from said line on the input side of said SCR's,
      said voltage converter means being adapted to split the phase of said signal and to full-wave rectify the split-phase signal and provide a D.C. ripple-voltage output,
   latch means to start and stop operation of said oscillator,
   timer means to effect latching operation of said latch means to initiate operation of said oscillator at the end of a predetermined time-delay interval,
   voltage detector means responsive to the output of said voltage converter means to operate said latch means to unlatching condition in response to an undervoltage in said line, thereby effecting cessation of operation of said oscillator to open said line, and
   overvoltage detector and synchronism detector means,
      said overvoltage detector and synchronism detector means being adapted to operate said latch means to unlatching condition in response to an overvoltage in said line, or in response to an asynchronous condition between said line and an associated standby power-supply system.

6. A line control for an A.C. power line through which an alternating voltage wave having a predetermined frequency and magnitude is normally passed, comprising:
   an electronic switch interposed in said line and incorporating first and second SCR's,
   a unijunction transistor relaxation oscillator,
   amplifier and transformer means to deliver voltage pulses from said oscillator to the gates of said SCR's to trigger the same, voltage converter means to derive a signal from said line on the input side of said SCR's,
    said voltage converter means being adapted to split the phase of said signal and to full-wave rectify the split-phase signal and provide a D.C. ripple-voltage output,
latch means to start and stop operation of said oscillator,
timer means to effect latching operation of said latch means to initiate operation of said oscillator at the end of a predetermined time-delay interval,
    said timer means being a second unijunction transistor relaxation oscillator having an extremely long period, and
voltage detector means responsive to the output of said voltage converter means to operate said latch means to unlatching condition in response to an under-voltage in said line, thereby effecting cessation of operation of said first-mentioned oscillator to open said line.

7. A line control for an A.C. power line through which an alternating voltage wave having a predetermined frequency and magnitude is normally passed, comprising:
an electronic switch interposed in said line and incorporating first and second SCR's,
a unijunction transistor relaxation oscillator,
amplifier and transformer means to deliver voltage pulses from said oscillator to the gates of said SCR's to trigger the same,
voltage converter means to derive a signal from said line on the input side of said SCR's,
    said voltage converter means being adapted to split the phase of said signal and to full-wave rectify the split-phase signal and provide a D.C. ripple-voltage output,
a synchronism control connected to said line on the input side of said SCR's,
battery powered inverter means connected to said line on the output side of said SCR's,
means to effect driving of said inverter means by said synchronism control to thereby operate said inverter means in frequency synchronism with the line voltage wave,
latch means to start and stop operation of said oscillator,
timer means to effect latching operation of said latch means to initiate operation of said oscillator at the end of a predetermined time-delay interval, and
voltage detector means responsive to the output of said voltage converter means to operate said latch means to unlatching condition in response to an under-voltage in said line, thereby effecting cessation of operation of said oscillator to open said line.

8. A standby power-supply system for use with an A.C. power line containing an A.C. voltage wave, said system including:
a line switch interposed in said line,
a synchronism control,
a battery-inverter system connected to said line on the output side of said line switch,
means to derive a synchronism signal from said line on the input side of said line switch and to transmit said synchronism signal to said synchronism control,
a synchronism detector,
means to transmit a signal from said synchronism control to said synchronism detector,
means to transmit a signal from said inverter system to said synchronism detector, and
means operated by said synchronism detector to open said line switch in response to asynchronism between said signals to said synchronism detector from said synchronism control and said inverter system.

9. The invention as claimed in claim 8, in which circuit means are provided to vary the phase relationship between said synchronism signal and the voltage wave present in said power line on the input side of said line switch.

References Cited

UNITED STATES PATENTS

| | | | |
|---|---|---|---|
| 3,293,446 | 12/1966 | Baude | 307—66 |
| 2,862,111 | 11/1958 | Richards | 307—87 |
| 2,929,941 | 3/1960 | Bobo | 307—87 |
| 3,201,592 | 8/1965 | Reinert | 307—64 |
| 3,229,111 | 1/1966 | Schumacher | 307—64 |

ORIS L. RADER, *Primary Examiner.*

W. E. DUNCANSON, *Assistant Examiner.*